(12) United States Patent
Zhu

(10) Patent No.: US 11,325,632 B2
(45) Date of Patent: May 10, 2022

(54) ROD LOCKING MECHANISM AND STROLLER THEREWITH

(71) Applicant: Wonderland Switzerland AG, Steinhausen (CH)

(72) Inventor: Wanquan Zhu, Guangdong (CN)

(73) Assignee: Wonderland Switzerland AG, Steinhausen (CH)

( * ) Notice: Subject to any disclaimer, the term of this patent is extended or adjusted under 35 U.S.C. 154(b) by 121 days.

(21) Appl. No.: 16/927,955

(22) Filed: Jul. 13, 2020

(65) Prior Publication Data
US 2021/0016818 A1 Jan. 21, 2021

(30) Foreign Application Priority Data
Jul. 15, 2019 (CN) .......................... 201910636299.2

(51) Int. Cl.
*B62B 7/06* (2006.01)
*B62B 7/08* (2006.01)
*B62B 9/20* (2006.01)

(52) U.S. Cl.
CPC ............... *B62B 7/062* (2013.01); *B62B 7/08* (2013.01); *B62B 9/20* (2013.01); *B62B 2205/20* (2013.01)

(58) Field of Classification Search
CPC ........ B62B 7/062; B62B 9/20; B62B 2205/20
See application file for complete search history.

(56) References Cited

U.S. PATENT DOCUMENTS

| 3,583,734 | A | * | 6/1971 | Magi | ........................ | F16C 11/10 |
| | | | | | | 403/96 |
| 5,551,745 | A | * | 9/1996 | Huang | .................... | B60J 7/1282 |
| | | | | | | 135/133 |
| 9,637,154 | B2 | * | 5/2017 | Liu | ...................... | E05D 11/1007 |
| 2011/0084467 | A1 | * | 4/2011 | Liao | ......................... | B62B 7/064 |
| | | | | | | 280/642 |
| 2013/0234476 | A1 | * | 9/2013 | Smith | ..................... | B62B 7/064 |
| | | | | | | 297/16.1 |
| 2014/0327233 | A1 | * | 11/2014 | Greger | .................... | B62B 7/062 |
| | | | | | | 280/650 |

(Continued)

FOREIGN PATENT DOCUMENTS

| CN | 105035146 B | 11/2017 |
| EP | 3 147 178 A1 | 3/2017 |
| GB | 25524 | 8/1913 |

*Primary Examiner* — Erez Gurari
(74) *Attorney, Agent, or Firm* — Winston Hsu

(57) ABSTRACT

A rod locking mechanism includes a central hub, a first rod component and a locking component. The first rod component is pivotally connected to the central hub. The first rod component includes an abutting portion. The abutting portion is movable between a first position and a second position when the first rod component pivots relative to the central hub. The locking component is movably disposed on the central hub. The abutting portion is located at a first side of the locking component when the abutting portion is located at the first position. The abutting portion drives the locking component to move when the abutting portion moves from the first position toward the second position, and the abutting portion abuts against a second side of the locking component opposite to the first side of the locking component when the abutting portion is located at the second position.

21 Claims, 13 Drawing Sheets

(56) References Cited

U.S. PATENT DOCUMENTS

| | | | |
|---|---|---|---|
| 2015/0344058 A1* | 12/2015 | Liu | E05D 11/1007 |
| | | | 280/647 |
| 2017/0072981 A1* | 3/2017 | Reichardt | B62B 7/062 |
| 2018/0043917 A1* | 2/2018 | Plested | B62B 9/20 |
| 2018/0362066 A1* | 12/2018 | Zhong | B62B 7/062 |
| 2019/0322304 A1* | 10/2019 | Zhong | B62B 9/102 |
| 2020/0353967 A1* | 11/2020 | Horst | B62B 7/062 |
| 2021/0016818 A1* | 1/2021 | Zhu | B62B 7/062 |
| 2021/0114649 A1* | 4/2021 | Yuan | B62B 9/12 |

\* cited by examiner

ROD LOCKING MECHANISM AND STROLLER THEREWITH

BACKGROUND OF THE INVENTION

1. Field of the Invention

The present invention relates to a child product, and more specifically, to a rod locking mechanism and a stroller therewith.

2. Description of the Prior Art

In order to meet the practical demands of users and bring convenience in transportation or carrying, strollers are usually designed to be foldable. Therefore, the strollers can be unfolded when it is desired to use the strollers, and the strollers also can be folded into a smaller volume for easy storage, transportation or carrying when it is not required to use the strollers.

Currently, there are two main folding mechanisms for folding the strollers. One of the main folding mechanisms is to detach a seat from a frame and then unlock the frame to fold. The other of the main folding mechanisms is to rotatably fold the seat relative to the frame and then unlock the frame to fold. However, when the stroller is folded, certain deformations may occur among parts of the stroller, e.g., a front foot, a rear foot, a handle, so that the parts of the stroller cannot be locked properly, which results in instability of the folded stroller and causes unintentional unfolding operation of the stroller. Therefore, it is inconvenience in transportation or carrying. Although there are strollers having locking devices for locking the folded strollers, such strollers have complicated structures or require cumbersome operation before being unfolded, so they cannot satisfy the users' needs.

Therefore, it is necessary to provide an improved locking mechanism and a stroller therewith for solving the aforementioned problems.

SUMMARY OF THE INVENTION

It is an objective of the present invention to provide a rod locking mechanism and a stroller therewith which have advantages of simple structure and easy operation.

In order to achieve the aforementioned objective, the present invention discloses a rod locking mechanism. The rod locking mechanism includes a central hub, a first rod component and a locking component. The first rod component is pivotally connected to the central hub. The first rod component includes an abutting portion. The abutting portion is movable between a first position and a second position when the first rod component pivots relative to the central hub. The locking component is movably disposed on the central hub. The abutting portion is located at a first side of the locking component when the abutting portion is located at the first position. The abutting portion drives the locking component to move when the abutting portion moves from the first position toward the second position, and the abutting portion abuts against a second side of the locking component opposite to the first side of the locking component when the abutting portion is located at the second position.

Preferably, according to an embodiment of the present invention, the locking component is slidably disposed on the central hub, and the abutting portion pushes the locking component to slide when the abutting portion moves from the first position toward the second position.

Preferably, according to an embodiment of the present invention, the rod locking mechanism further includes a first resilient component for biasing the locking component to recover. A first end of the first resilient component abuts against the central hub, and a second end of the first resilient component abuts against the locking component.

Preferably, according to an embodiment of the present invention, an accommodating slot is formed on the locking component for accommodating the second end of the first resilient component.

Preferably, according to an embodiment of the present invention, the locking component includes a driven edge, and the locking component is driven to slide by cooperation of the driven edge and the abutting portion when the abutting portion moves from the first position toward the second position.

Preferably, according to an embodiment of the present invention, the locking component further includes an abutting edge, and the locking component abuts against the abutting portion by the abutting edge when the abutting portion is located at the second position.

Preferably, according to an embodiment of the present invention, the driven edge and the abutting edge are inclined relative to a sliding direction of the locking component. A sign of a slope of the driven edge relative to the sliding direction of the locking component is opposite to a sign of a slope of the abutting edge relative to the sliding direction of the locking component, and an absolute value of the slope of the driven edge relative to the sliding direction of the locking component is greater than an absolute value of the slope of the abutting edge relative to the sliding direction of the locking component.

Preferably, according to an embodiment of the present invention, the central hub includes a fixing base, and the locking component is slidably disposed on the fixing base.

Preferably, according to an embodiment of the present invention, at least one long hole is formed on the fixing base. At least one sliding slot is formed on the locking component. At least one wall of the at least one long hole is inserted into the at least one sliding slot. The locking component is slidable along a longitudinal direction of the long hole by cooperation of the at least one sliding slot and the at least one wall of the at least one long hole.

In order to achieve the aforementioned objective, the present invention further discloses a stroller. The stroller includes a rod locking mechanism and a second rod component. The rod locking mechanism includes a central hub, a first rod component and at least one locking component. The first rod component is pivotally connected to the central hub. The first rod component includes an abutting portion. The abutting portion is movable between a first position and a second position when the first rod component pivots relative to the central hub. The at least one locking component is movably disposed on the central hub. The abutting portion is located at a first side of the at least one locking component when the abutting portion is located at the first position. The abutting portion drives the at least one locking component to move when the abutting portion moves from the first position toward the second position, and the abutting portion abuts against a second side of the at least one locking component opposite to the first side of the at least one locking component when the abutting portion is located at the second position. The second rod component is fixed on the central hub. The first rod component is pivotally movable relative to the second rod component.

Preferably, according to an embodiment of the present invention, the stroller further includes a linking component and a third rod component pivotally connected to the central hub, and two ends of the linking component are respectively pivotally connected to the first rod component and the third rod component.

Preferably, according to an embodiment of the present invention, the first rod component is one of a handle and a front foot. The third rod component is another one of the handle and the front foot. The second rod component is a rear foot. The at least one at least one locking component includes two locking components, and the two locking components respectively abut against the first rod component and the third rod component when the first rod component and the third rod component are pivotally folded relative to the second rod component.

Preferably, according to an embodiment of the present invention, the at least one locking component is slidably disposed on the central hub, and the abutting portion pushes the at least one locking component to slide when the abutting portion moves from the first position toward the second position.

Preferably, according to an embodiment of the present invention, the rod locking mechanism further includes a first resilient component for biasing the at least one locking component to recover. A first end of the first resilient component abuts against the central hub, and a second end of the first resilient component abuts against the at least one locking component.

Preferably, according to an embodiment of the present invention, an accommodating slot is formed on the at least one locking component for accommodating the second end of the first resilient component.

Preferably, according to an embodiment of the present invention, the at least one locking component includes a driven edge, and the at least one locking component is driven to slide by cooperation of the driven edge and the abutting portion when the abutting portion moves from the first position toward the second position.

Preferably, according to an embodiment of the present invention, the at least one locking component further includes an abutting edge, and the at least one locking component abuts against the abutting portion by the abutting edge when the abutting portion is located at the second position.

Preferably, according to an embodiment of the present invention, the driven edge and the abutting edge are inclined relative to a sliding direction of the at least one locking component. A sign of a slope of the driven edge relative to the sliding direction of the at least one locking component is opposite to a sign of a slope of the abutting edge relative to the sliding direction of the at least one locking component, and an absolute value of the slope of the driven edge relative to the sliding direction of the at least one locking component is greater than an absolute value of the slope of the abutting edge relative to the sliding direction of the at least one locking component.

Preferably, according to an embodiment of the present invention, the central hub includes a fixing base, and the at least one locking component is slidably disposed on the fixing base.

Preferably, according to an embodiment of the present invention, at least one long hole is formed on the fixing base. At least one sliding slot is formed on the at least one locking component. At least one wall of the at least one long hole is inserted into the at least one sliding slot. The at least one locking component is slidable along a longitudinal direction of the long hole by cooperation of the at least one sliding slot and the at least one wall of the at least one long hole.

Preferably, according to an embodiment of the present invention, the first rod component is one of a handle and a front foot. The second rod component is a rear foot, and the at least one locking component abuts against the first rod component when the first rod component is pivotally folded relative to the second rod component.

In summary, in the present invention, when the first rod component is pivotally folded relative to the central hub, the abutting portion can moves from the first position to the second position. When the abutting portion is located at the second position, the abutting portion abuts against the second side of the locking component to restrain the abutting portion from leaving from the second position for locking the first rod component, so as to prevent an unintentional unfolding operation of the first rod component. When it is desired to pivotally unfold the first rod component relative to the central hub, the first rod component can be operated to drive the abutting portion to move from the second position to the first position by overcoming abutment of the locking component, which achieves a purpose of an unlocking operation and the unfolding operation of the first rod component. The rod locking mechanism of the present invention can lock the first rod component for preventing the unintentional unfolding operation of the first rod component when the first rod component is pivotally folded and can unlock the first rod component by operating the first rod component to overcome the abutment of the locking component. Therefore, the present invention brings convenience in transportation or carrying. Furthermore, the present invention has advantages of not only simple structure and easy operation but also enhanced safety and enhanced usability.

These and other objectives of the present invention will no doubt become obvious to those of ordinary skill in the art after reading the following detailed description of the preferred embodiment that is illustrated in the various figures and drawings.

DETAILED DESCRIPTION

In order to illustrate technical specifications and structural features as well as achieved purposes and effects of the present invention, relevant embodiments and figures are described as follows.

Figure 1:
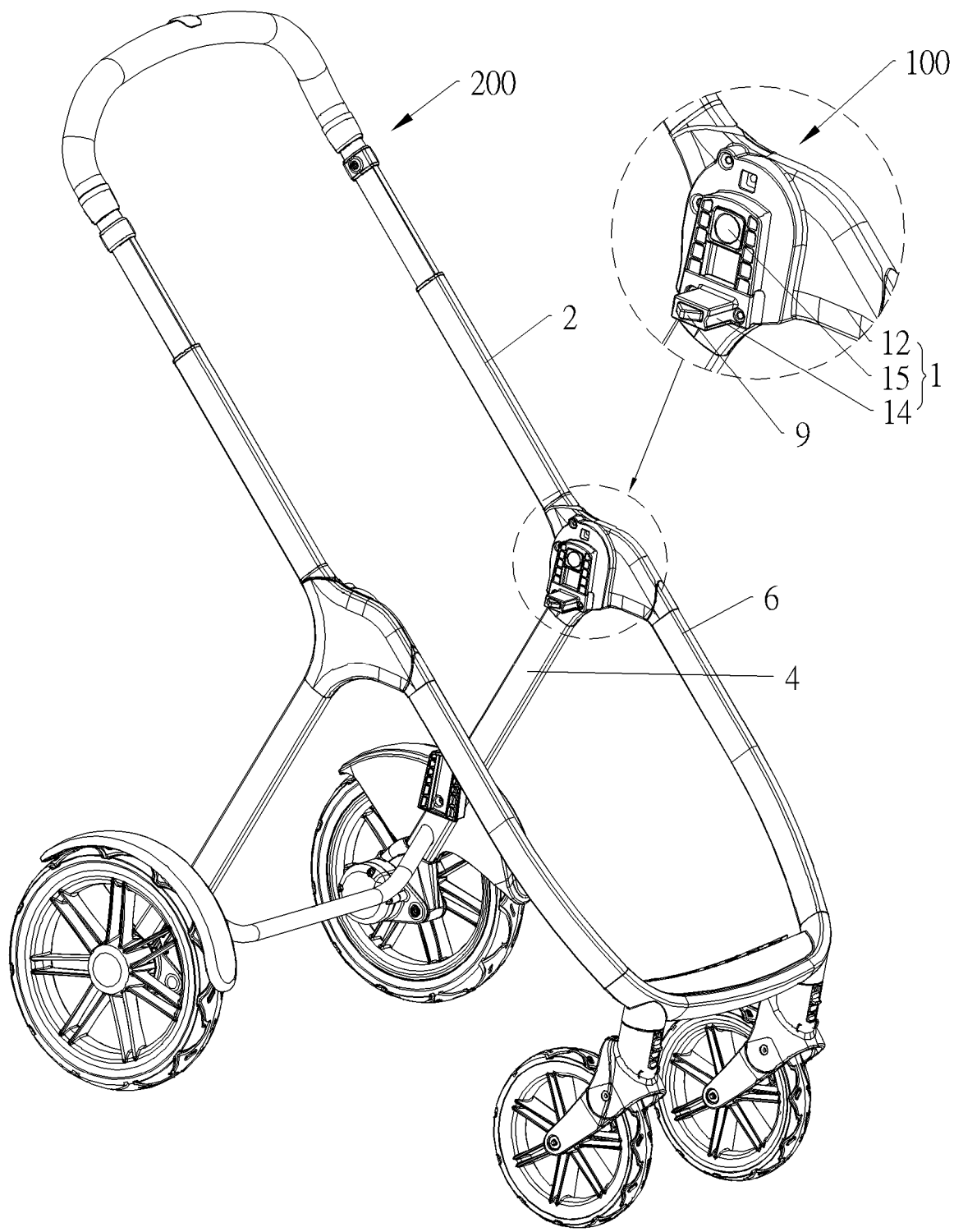
FIG. 1 is a schematic diagram of a stroller according to an embodiment of the present invention.
Figure 2:
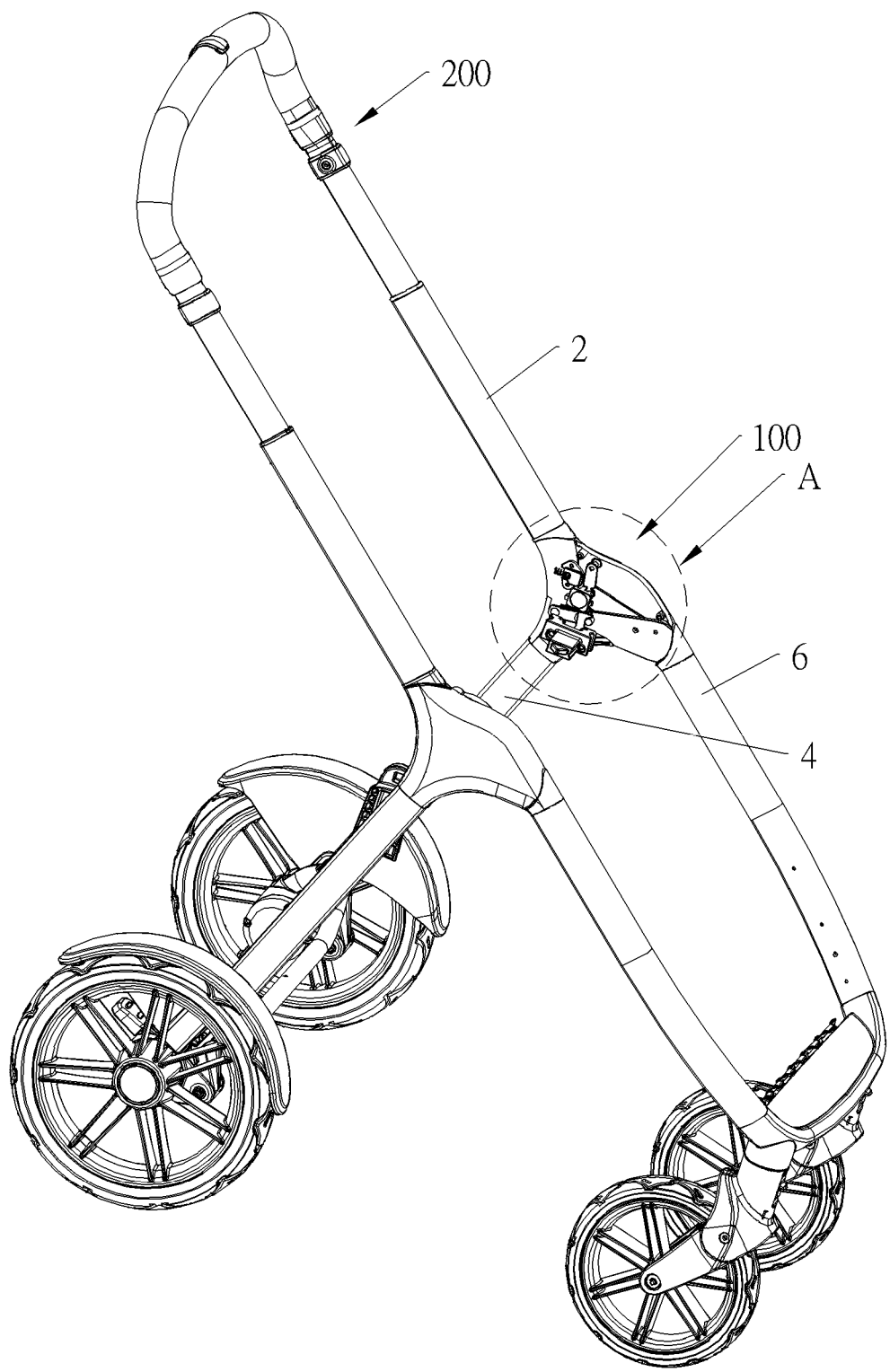
FIG. 2 is a partial diagram of the stroller according to the embodiment of the present invention.
Figure 3:
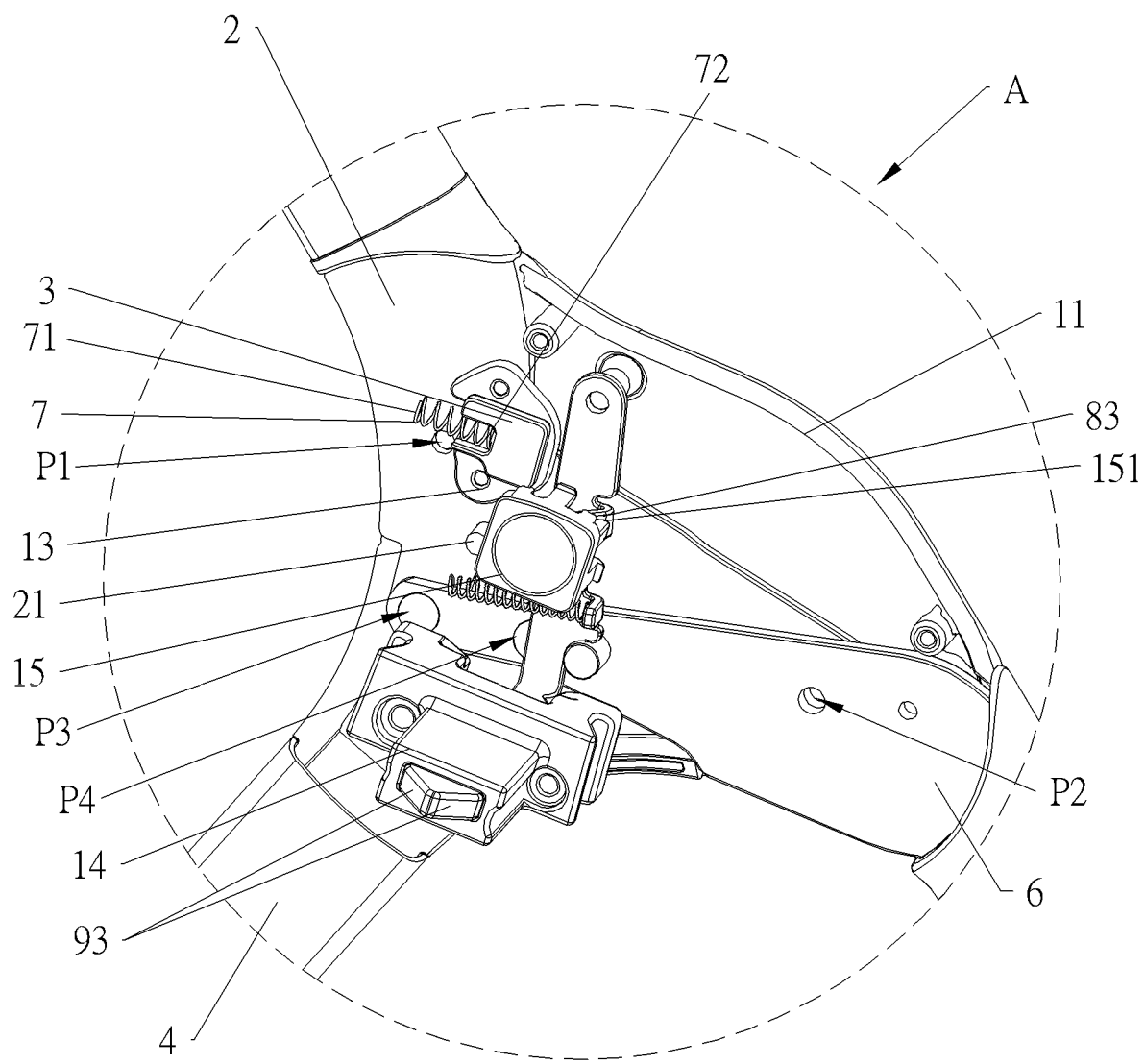
FIG. 3 is an enlarged diagram of an A portion of the stroller shown in FIG. 2 according to the embodiment of the present invention.
Figure 9:
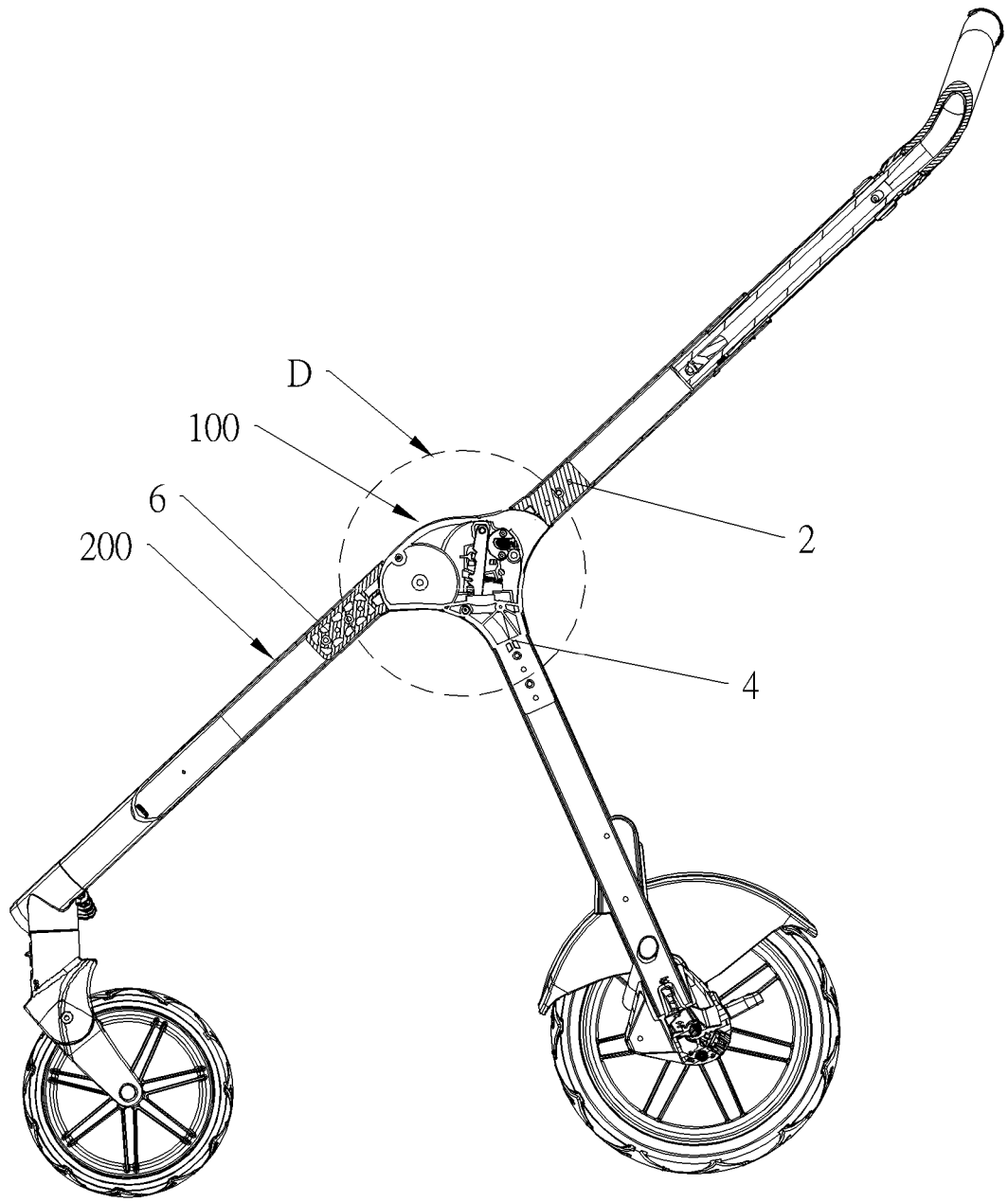
FIG. 9 is a sectional diagram of the stroller in an unfolded state according to the embodiment of the present invention.
Figure 10:
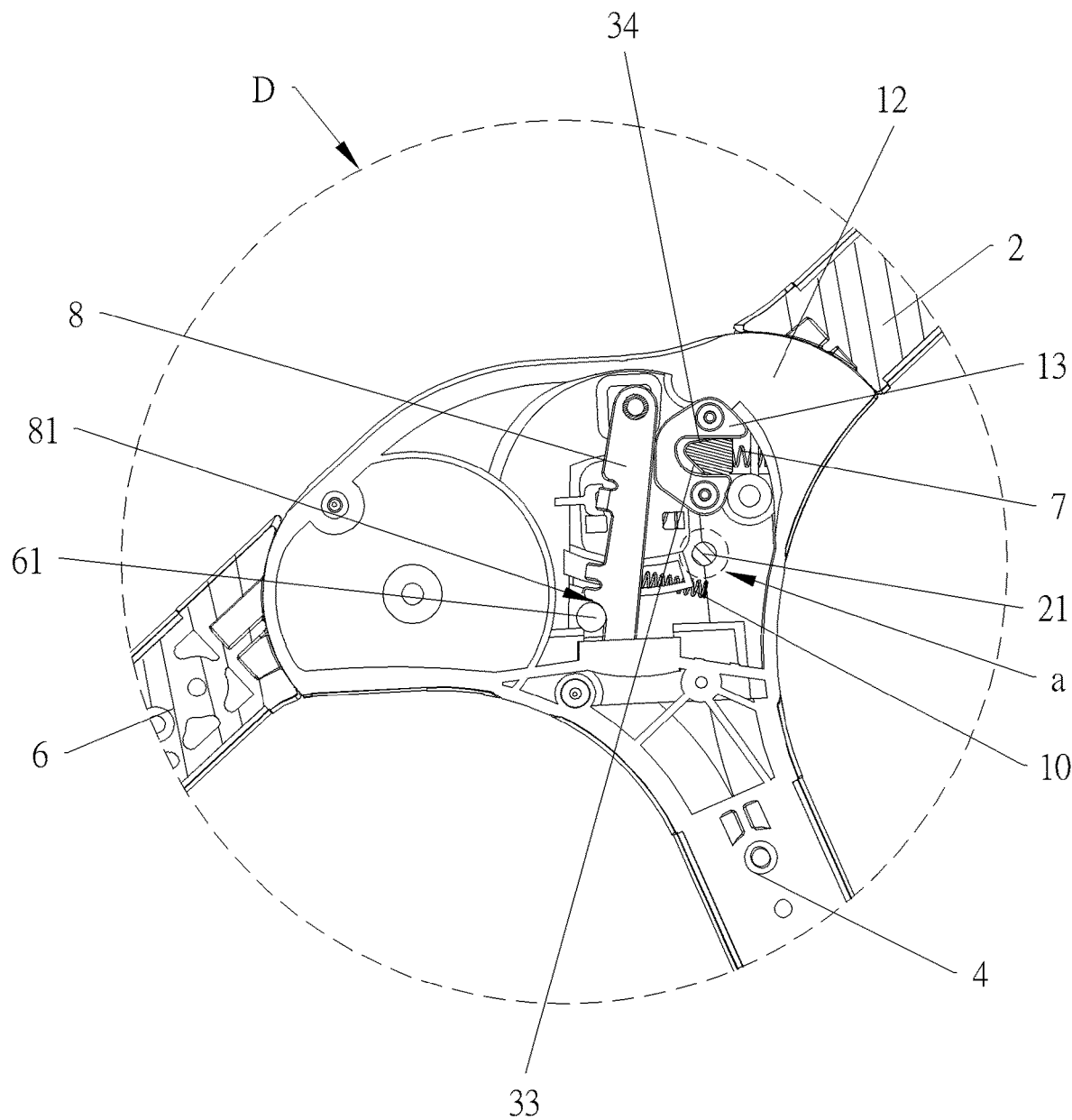
FIG. 10 is an enlarged diagram of a D portion of the stroller shown in FIG. 9 according to the embodiment of the present invention.
Figure 11:
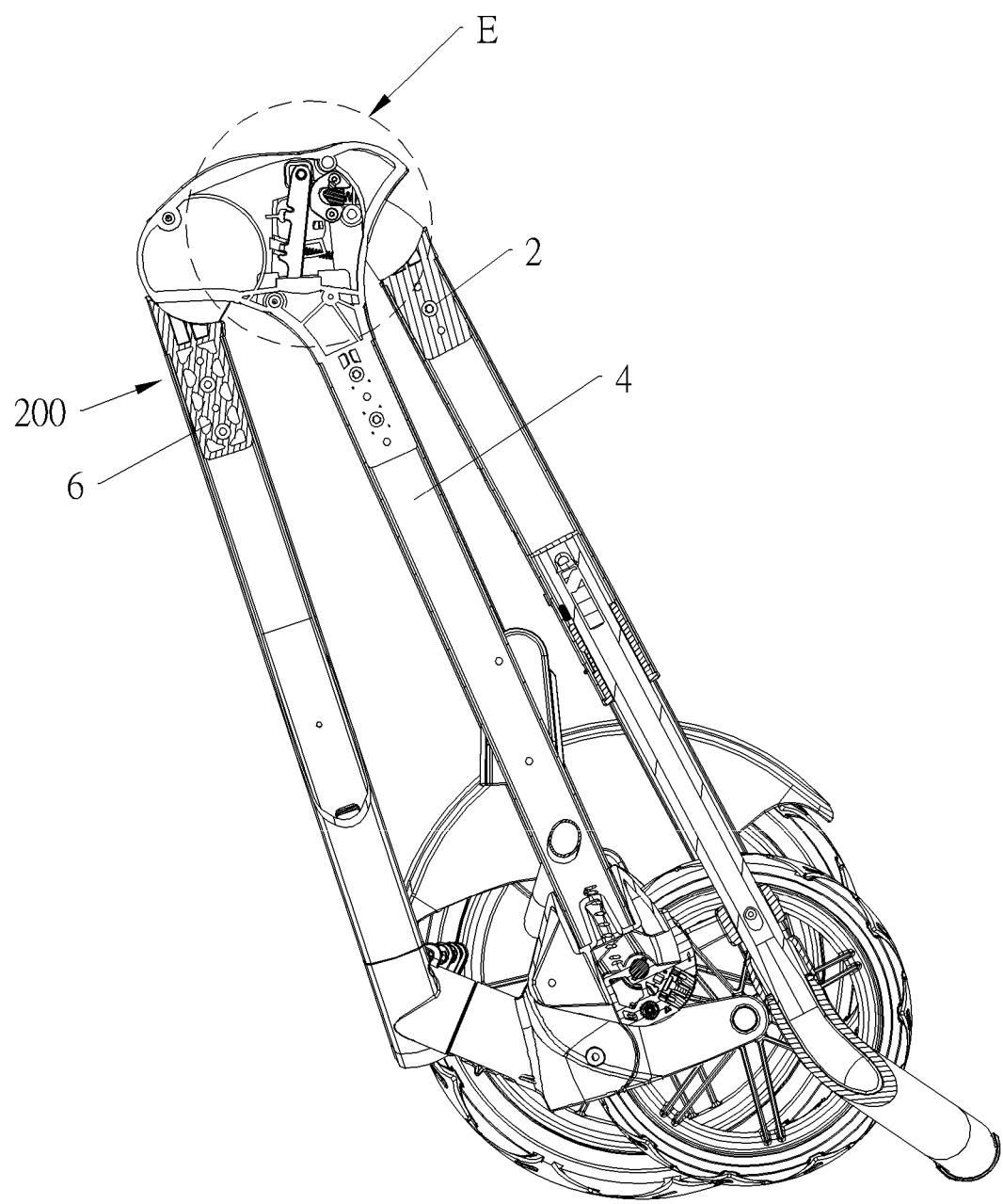
FIG. 11 is a sectional diagram of the stroller in the folded state according to the embodiment of the present invention.
Figure 12:
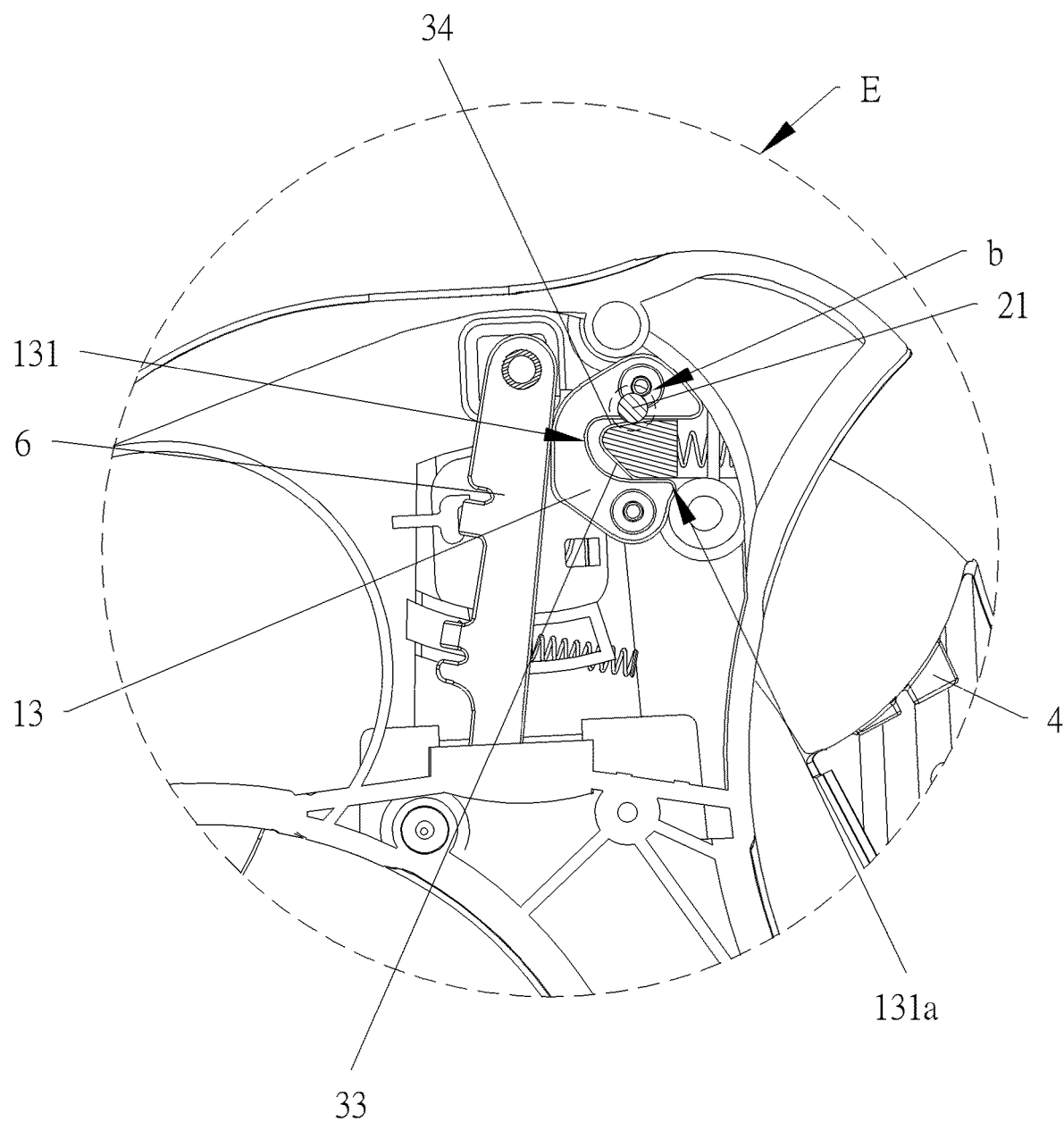
FIG. 12 is an enlarged diagram of an E portion of the stroller shown in FIG. 11 according to the embodiment of the present invention.

Please refer to FIG. 1 to FIG. 3 and FIG. 9 to FIG. 12. FIG. 1 is a schematic diagram of a stroller 200 according to an embodiment of the present invention. FIG. 2 is a partial diagram of the stroller 200 according to the embodiment of the present invention. FIG. 3 is an enlarged diagram of an A portion of the stroller 200 shown in FIG. 2 according to the embodiment of the present invention. FIG. 9 is a sectional diagram of the stroller 200 in an unfolded state according to the embodiment of the present invention. FIG. 10 is an enlarged diagram of a D portion of the stroller 200 shown in FIG. 9 according to the embodiment of the present invention. FIG. 11 is a sectional diagram of the stroller 200 in a folded state according to the embodiment of the present invention. FIG. 12 is an enlarged diagram of an E portion of the stroller 200 shown in FIG. 11 according to the embodiment of the present invention. In order to illustrate the present invention more clearly, FIG. 1 to FIG. 3 and FIG. 9 to FIG. 12 only illustrate part of the stroller 200, and some components, such as a child seat or a sun shade, are omitted. As shown in FIG. 1 to FIG. 3 and FIG. 9 to FIG. 12, the stroller 200 includes two rod locking mechanisms 100, a second rod component 4 and a third rod component 6. The two locking mechanisms 100 are located at two lateral sides and have identical structures. Detailed description for the locking mechanism 100 at one lateral side is provided as follows.

The rod locking mechanism 100 includes a central hub 1, a first rod component 2 and a locking component 3. The locking component 3 is movably disposed on the central hub 1. The first rod component 2 is pivotally connected to the central hub 1, and the second rod component 4 is fixed to the central hub 1, so that the first rod component 2 is pivotally movable relative to the second rod component 4. The first rod component 2 includes an abutting portion 21. The abutting portion 21 is movable between a first position as shown in FIG. 10 and a second position as shown in FIG. 12 when the first rod component 2 is pivotally folded relative to the central hub 1. The abutting portion 21 is located at a first side of the locking component 3 when the abutting portion 21 is located at the first position. The abutting portion 21 drives the locking component 3 to move for allowing the abutting portion 21 to pass across the locking component 3 when the abutting portion 21 moves from the first position toward the second position. When the abutting portion 21 is located at the second position, the abutting portion 21 abuts against a second side of the locking component 3 opposite to the first side of the locking component 3 to restrain the abutting portion 21 from leaving from the second position, i.e., to lock the abutting portion 21, for locking the first rod component 2, so as to prevent an unintentional unfolding operation of the first rod component 2. When it is desired to pivotally unfold the first rod component 2 relative to the central hub 1, the first rod component 2 can be operated to be unfolded pivotally to drive the abutting portion 21 to move across the locking component 3 from the second position to the first position by overcoming abutment of the locking component 3, which achieves a purpose of an unlocking operation and the unfolding operation of the first rod component 2.

In order to allow the third rod component 6 and the first rod component 2 to be folded relative to the second rod component 4 synchronously, the stroller 200 further includes a linking component 5. The third rod component 6 is pivotally connected to the central hub 1. Two ends of the linking component 5 are respectively pivotally connected to the first rod component 2 and the third rod component 6, so that the first rod component 2 can drive the third rod component 6 to pivot relative to the second rod component 4 by the linking component 5 when the first rod component 2 pivots relative to the second rod component 4, and vice versa.

In this embodiment, the first rod component 2, the second rod component 4, the third rod component 6 can be a handle, a rear foot and a front foot of the stroller 200 respectively, and the locking component 3 can abut against the first rod component 2, i.e., the handle, when the first rod component 2 is pivotally folded relative to the second rod component 4. However, the present invention is not limited to this embodiment. The first rod component, the second rod component or the third rod component can be any of the handle, the rear foot and the front foot of the stroller. For example, in another embodiment, the first rod component, the second rod component and the third rod component can be the front foot, the rear foot and the handle of the stroller respectively, and the locking component can abut against the first rod component, i.e., the front foot, when the first rod component is pivotally folded relative to the second rod component.

Figure 4:
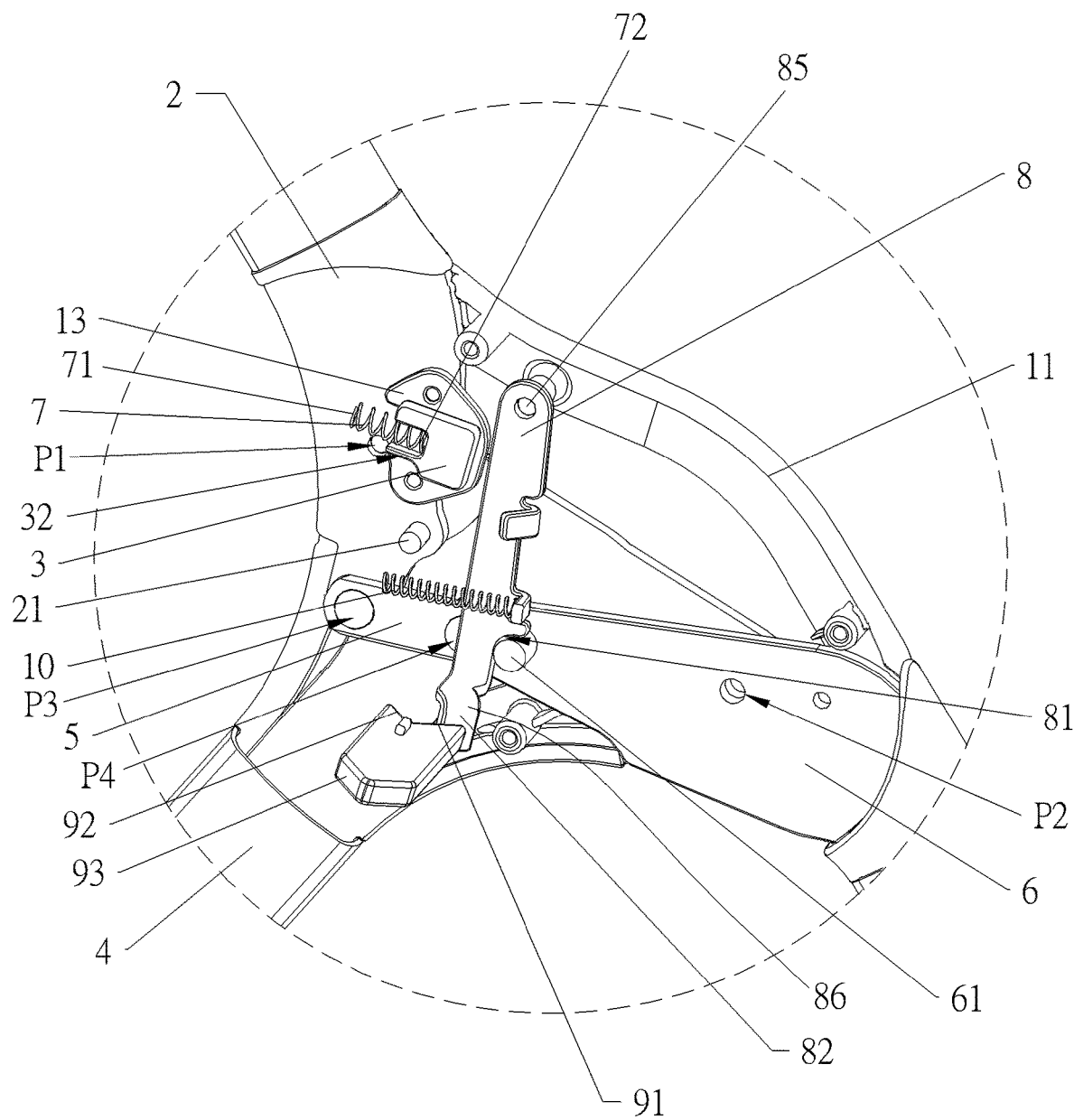
FIG. 4 is a partial enlarged diagram of the A portion of the stroller shown in FIG. 2 according to the embodiment of the present invention.
Figure 5:
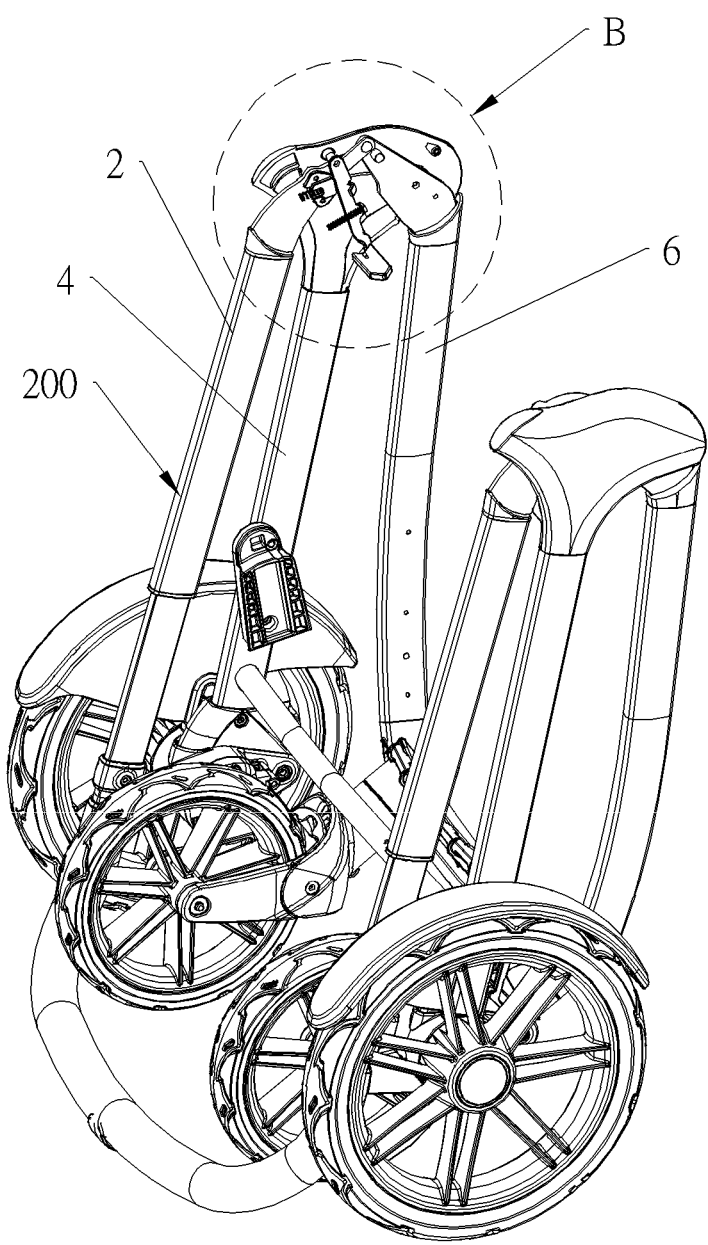
FIG. 5 is a partial diagram of the stroller in a folded state according to the embodiment of the present invention.
Figure 6:
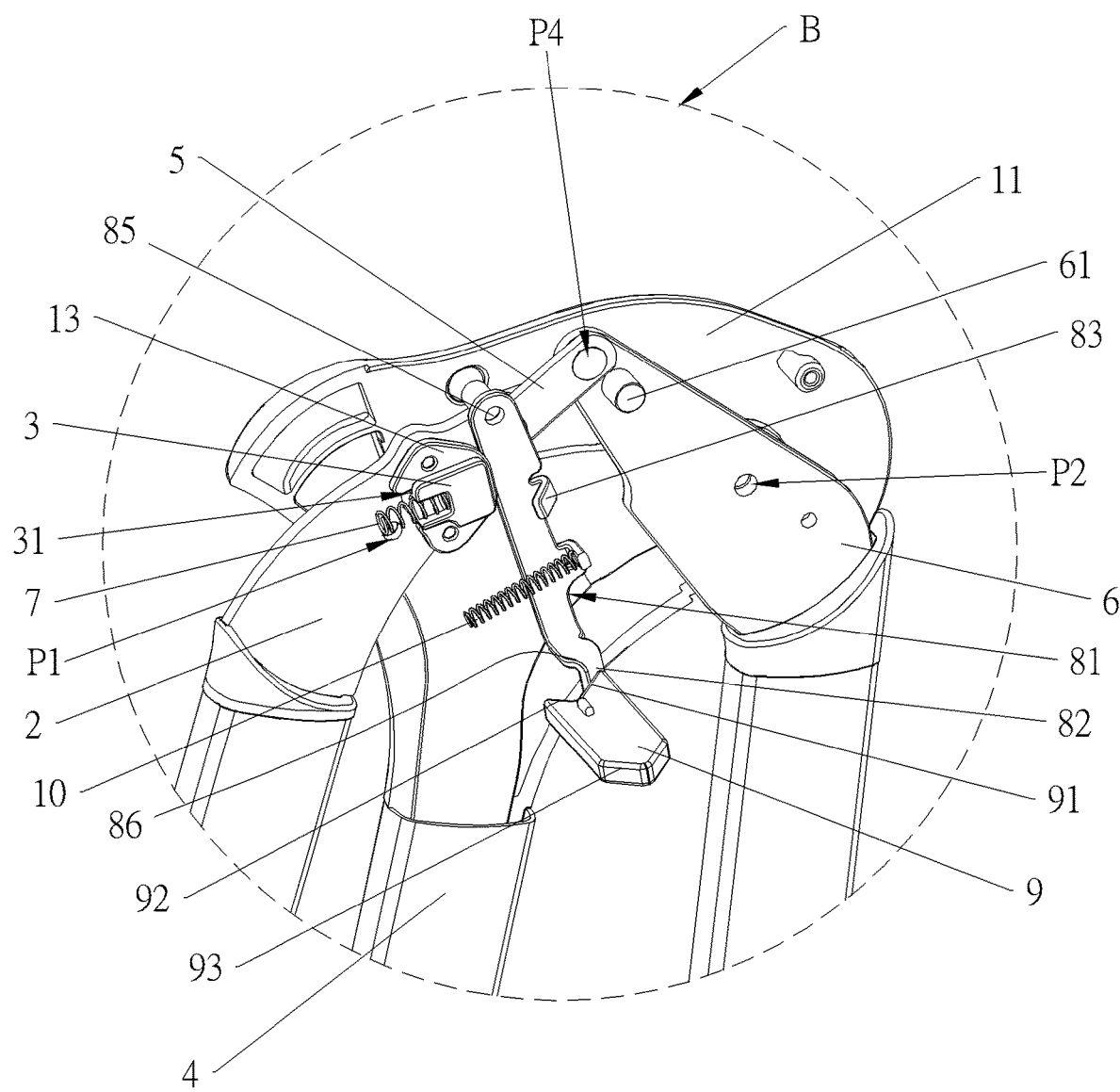
FIG. 6 is an enlarged diagram of a B portion of the stroller shown in FIG. 5 according to the embodiment of the present invention.
Figure 7:
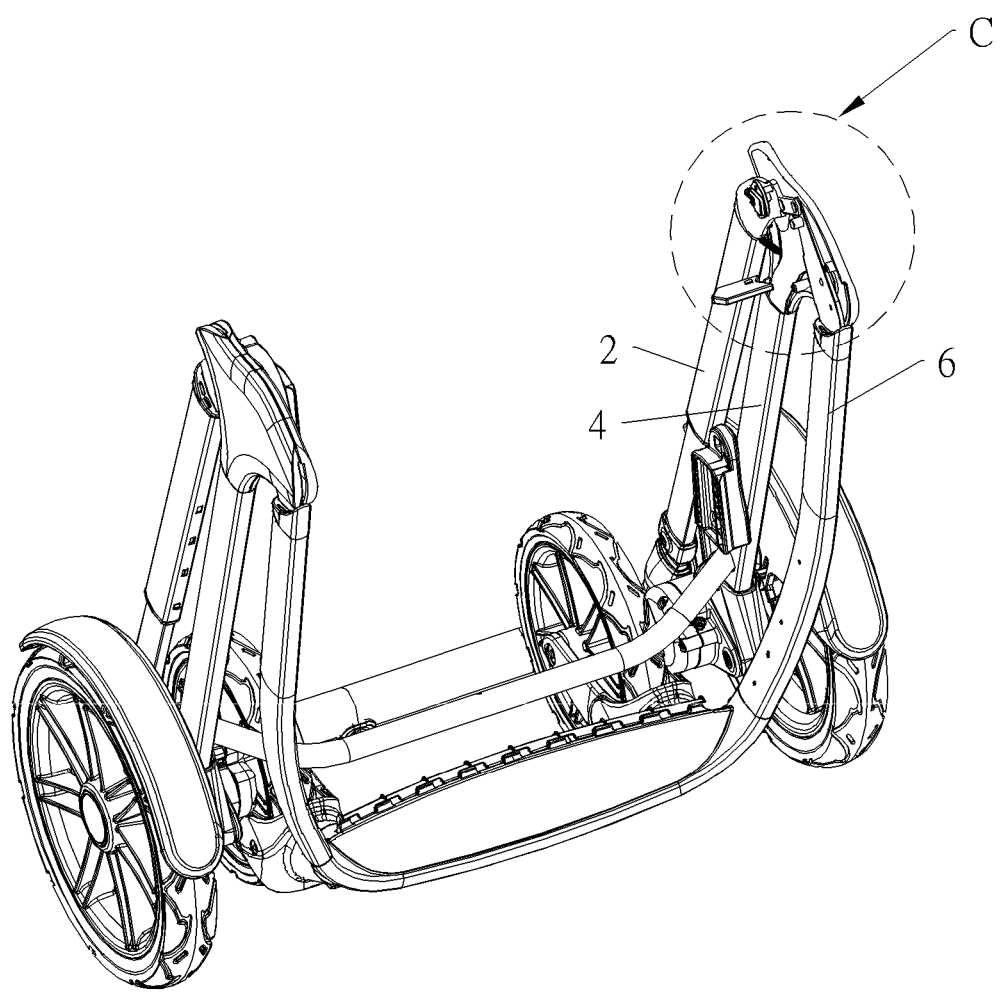
FIG. 7 is another partial diagram of the stroller in the folded state according to the embodiment of the present invention.
Figure 8:
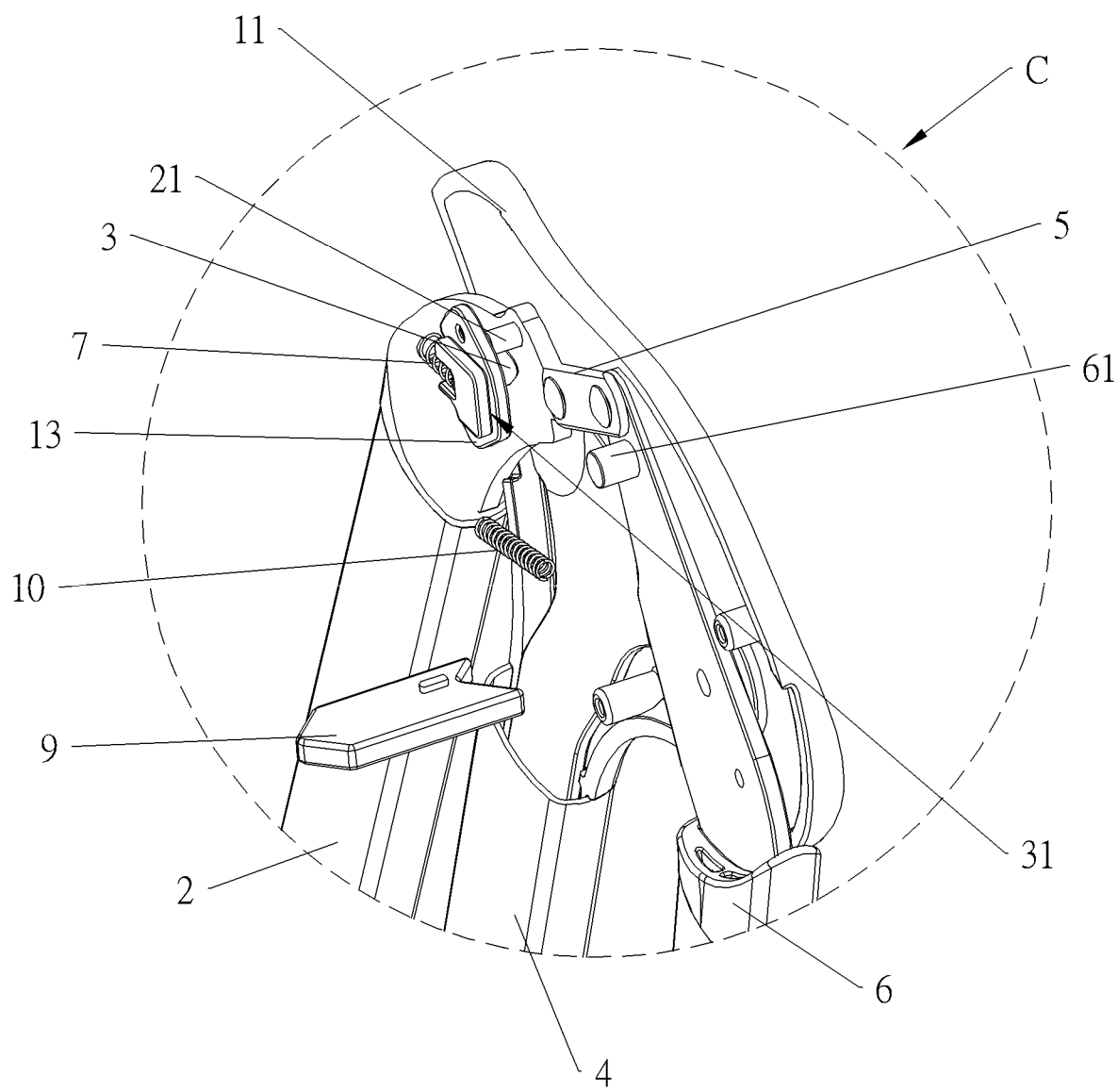
FIG. 8 is an enlarged diagram of a C portion of the stroller shown in FIG. 7 according to the embodiment of the present invention.

Please refer to FIG. 1 to FIG. 8 and FIG. 12. FIG. 4 is a partial enlarged diagram of the A portion of the stroller 200 shown in FIG. 2 according to the embodiment of the present invention. FIG. 5 is a partial diagram of the stroller 200 in the folded state according to the embodiment of the present invention. FIG. 6 is an enlarged diagram of a B portion of the stroller 200 shown in FIG. 5 according to the embodiment of the present invention. FIG. 7 is another partial diagram of the stroller 200 in the folded state according to the embodiment of the present invention. FIG. 8 is an enlarged diagram of a C portion of the stroller 200 shown in FIG. 7 according to the embodiment of the present invention. As shown in FIG. 1 to FIG. 8 and FIG. 12, the central hub 1 includes a base plate 11 and a covering component 12 which covers an inner side of the base plate 11 facing toward the covering component 12. Preferably, in this embodiment, the base plate 11 can be a flat structure, and a shape of the base plate 11 can match with a shape of the covering component 12. The first rod component 2 and the third rod component 6 are respectively pivotally connected to the base plate 11 at a first pivoting point P1 and a second pivoting point P2, and the second rod component 4 is fixed on the base plate 11. The linking component 5 is pivotally connected to the first rod component 2 at a third pivoting point P3 and pivotally connected to the third rod component 6 at a fourth pivoting point P4. Such configuration allows the first rod component 2 and the third rod component 6 to be pivotally unfolded or folded relative to the second rod component 4. The locking component 3 is slidably disposed on an inner side of the covering component 12 of the central hub 1 facing toward the base plate 11. The abutting portion 21 is located at a side of the locking component 3 facing toward the locking component 3. The locking component 3 is located in a moving path of the abutting portion 21. When the first rod component 2 is pivotally folded relative to the second rod component 4, the abutting portion 21 drives the locking component 3 to slide away from the moving path of the abutting portion 21 so as to allow the abutting portion 21 to pass across the locking component 3 when the abutting portion 21 moves from the first position toward the second position. When the first rod component 2 passes across the locking component 3 to be located at the second position, the locking component 3 is recovered to drive the second side of the locking component 3 to abut against the abutting portion 21 for locking the abutting portion 21.

Specifically, the central hub 1 further includes a fixing base 13. The fixing base 13 is fixed on the inner side of the covering component 12. The locking component 3 is slidably disposed on the fixing base 13. The fixing base 13 can guide a sliding movement of the locking component 3 when the locking component 3 is driven to slide by abutment of the abutting portion 21. Preferably, the fixing base 13 can be a flat structure, and the fixing base 13 can be fixed on the covering component 12 by screwing or integrally forming the fixing base 13 with the covering component 12. However, the present invention is not limited thereto.

More specifically, a long hole 131 is formed on the fixing base 13. The long hole 131 has an opening 131a. Two sliding slots 31 are formed on the locking component 3. The locking component 3 is partially sleeved in the long hole 131 via the opening 131a. Two walls of the long hole 131 are inserted into the two sliding slots 31. The locking component 3 is slidable along a longitudinal direction of the long hole 131 by cooperation of the two sliding slots 31 and the two walls of the long hole 131. Such configuration not only ensures a sliding direction of the sliding movement of the locking component 3 but also provides an effect of restraining the locking component 3 from shaking during the sliding movement of the locking component 3 to ensure stability of the sliding movement of the locking component 3. However, the numbers of the wall of the long hole, the long hole and the sliding slot are not limited to this embodiment. For example, in another embodiment, there can be one sliding slot formed on the locking component and one long hole formed on the fixing base, and one wall of the long hole is slidably inserted into the sliding slot.

Besides, in order to recover the locking component 3 automatically, the rod locking mechanism 100 further includes a first resilient component 7. A first end 71 of the first resilient component 7 abuts against an inner wall of the covering component 12 of the central hub 1, and a second end 72 of the first resilient component 7 abuts against the locking component 3, so that the locking component 3 is biased to resiliently abut against the abutting portion 21, which achieves a purpose of recovering the locking component 3 to abut against the abutting portion 21 for locking the abutting portion 21 when the abutting portion 21 is located at the second position. Such configuration not only has advantages of simple structure and low manufacturing cost but also makes abutment of the abutting portion 21 and the locking component 3 more flexible. Preferably, the first resilient component 7 can be a compression spring. However, the present invention is not limited to this embodiment. For example, in another embodiment, the locking component also can be recovered by a pneumatic driving device or an electrical motor driving device.

As shown in FIG. 3 and FIG. 4, an accommodating slot 32 is formed on the locking component 3 for accommodating the second end 72 of the first resilient component 7. The second end 72 of the first resilient component 7 abuts against an inner wall of the accommodating slot 32. The first end 71 of the first resilient component 7 abuts against the inner side of the covering component 12 of the central hub 1. Such configuration not only makes the arrangement of the locking component 3 and the first resilient component 7 more compact but also prevents the first resilient component 7 from moving relative to the locking component 3, which concentrates a resilient force of the first resilient component 7 and enhances responsiveness of recovering of the locking component 3, so as to ensure the abutting portion 21 to be locked by the locking component 3 properly.

As shown in FIG. 9 to FIG. 12, the locking component 3 further includes a driven edge 33 and an abutting edge 34. The locking component 3 is driven to slide away from the moving path of the abutting portion 21 by cooperation of the driven edge 33 and the abutting portion 21 when the abutting portion 21 moves from the first position toward the second position. The locking component 3 abuts against the abutting portion 21 by the abutting edge 34 for locking the abutting portion 21 when the abutting portion 21 is located at the second position. Specifically, the driven edge 33 and the abutting edge 34 are inclined relative to the sliding direction of the locking component 3. The driven edge 33 and the abutting edge 34 are formed on an abutting end of the locking component 3 adjacent to the abutting portion 21 and respectively located adjacent to the first side and the second side of the locking component 3. A sign of a slope of the driven edge 33 relative to the sliding direction of the locking component 3 is opposite to a sign of a slope of the abutting edge 34 relative to the sliding direction of the locking component 3. An absolute value of the slope of the driven edge 33 relative to the sliding direction of the locking component 3 is greater than an absolute value of the slope of the abutting edge 34 relative to the sliding direction of the locking component 3. Preferably, the driven edge 33 can be an arc-shaped structure and extend from the first side of the locking component 3 toward the abutting edge 34 adjacent to the second side of the locking component 3. The abutting portion 21 abuts against the driven edge 33 to drive the locking component 3 to slide away from the moving path of the abutting portion 21 to allow the abutting portion 21 to pass across the locking component 3 when the abutting portion 21 moves from the first position toward the second position. When the abutting portion 21 is located at the second position, the locking component 3 can be recovered by the resiliently deformed first resilient component 7 to drive the abutting edge 34 of the locking component 3 to abut against the abutting portion 21 for locking the abutting portion 21. By the aforementioned configuration, the driven edge 33 can facilitate the abutting portion 21 to drive the locking component 3 to slide, and the abutting edge 34 can stably restrain the abutting portion 21 from leaving from the second position to prevent the unintentional unfolding operation of the first rod component 2.

As shown in FIG. 4 to FIG. 8, the rod locking mechanism 100 further includes a restraining component 8, a second resilient component 10 and a driven component 9 for cooperating with an external component, such as the child seat. A first end 85 of the restraining component 8 is disposed on the covering component 12 of the central hub 1. The restraining component 8 can engage with the third rod component 6 to restrain a pivotal movement of the third rod component 6 for locking the stroller 200 in the unfolded state. The second resilient component 10 abuts against the restraining component 8 for biasing the restraining component 8 to engage with the third rod component 6. The driven component 9 is movable disposed on the central hub 1. The driven component 9 can be driven by the external component, such as the child seat, to drive the restraining component 8 to disengage from the third rod component 6 to allow the pivotal movement of the third rod component 6 for unlocking the stroller 200. Specifically, an engaging portion 61 protrudes from the third rod component 6. An engaging notch 81 is formed on the restraining component 8 and for engaging with the engaging portion 61. When the engaging portion 61 engages with the engaging notch 81, the pivotal movement of the third rod component 6 is restrained by the restraining component 8. Furthermore, since the pivotal movement of the third rod component 6 is restrained by the restraining component 8, a pivotal movement of the first rod component 2 is restrained by the linking component 5.

Specifically, a driving inclined surface 91 is formed on an inner end of the driven component 9 facing toward the base plate 11. The restraining component 8 is pivotally connected to the central hub 1, and a second end 86 of the restraining component 8 opposite to the first end 85 of the restraining component 8 bends toward the driven component 9. An inclined portion 82 is formed on the second end 86 of the restraining component 8 and for cooperating with the driving inclined surface 91. The driving inclined surface 91 drives the restraining component 8 to pivotally disengage from the third rod component 6 along a clockwise direction shown in FIG. 4 by abutment of the driving inclined surface 91 and the inclined portion 82 when the driven inclined surface 91 slides toward the base plate 11. When the restraining component 8 pivots to disengage the engaging notch 81 from the engaging portion 61, the third rod component 6 and the first rod component 2 are allowed to be pivotally folded relative to the second rod component 4 because the third rod component 6 and the first rod component 2 are not abutted by the restraining component 8 and the linking component 5 respectively. Besides, preferably, a restraining inclined surface 92 can be formed on the inner end of the driven component 9 facing toward the base plate 11, and the restraining inclined surface 92 and the driving inclined surface 91 can be cooperatively formed in a V shape. The restraining inclined surface 92 can restrain a sliding distance of the inclined portion 82 relative to the driving inclined surface 91. However, the present invention is not limited to this embodiment. For example, in another embodiment, the restraining inclined surface can be omitted. Preferably, the second resilient component 10 can be a compression spring, and two ends of the second resilient component 10 can abut against an abutting part 84 of the restraining component 8 and the inner wall of the covering component 12.

As shown in FIG. 2 to FIG. 4, a guiding portion 14 protrudes from a lower end of the central hub 1 toward a center of the stroller 200. Preferably, the guiding portion 14 can be a hollow structure. The driven component 9 is slidably inserted into the guiding portion 14. An exposing end of the driven component 9 is exposed out of the guiding portion 14. Two operating inclined surfaces 93 are formed on the exposing end of the driven component 9 for cooperating with the external component. The external component, such as the child seat, can be operated to pivot to abut against the operating inclined surface 93 to drive the driven component 9 to slide into the guiding portion 14 for allowing the driven component 9 to cooperate with the restraining component 8. Preferably, the two operating incline surfaces 93 can be respectively formed on two sides of the exposing end of the driven component 9, so that the external component can drive the driven component 9 to slide no matter which direction the external component pivots along. In other words, the driven component 9 can be driven to slide when the external component pivots along the clockwise direction or a counter clockwise direction. However, the present invention is not limited to this embodiment. For example, there can be only one operating inclined surface formed on one side of the exposing end of the driven component for allowing the external component to drive the driven component when the external component pivots along one direction.

As shown in FIG. 1 to FIG. 4, a release button 15 is disposed on the central hub 1 for driving the restraining component 9 to disengage the engaging notch 81 of the restraining component 8 from the engaging portion 61 of the third rod component 6. The release button 15 is slidably disposed on the covering component 12. A releasing inclined surface 151 is formed on an end of the release button 15 for pushing the restraining component 8 away from the third rod component 6. A cooperating portion 83 is formed on the restraining component 8 and for cooperating with the releasing inclined surface 151. The release button 15 can drive the restraining component 8 by abutment of the releasing inclined surface 151 and the cooperating portion 83 of the restraining component 8 to disengage the engaging notch 81 of the restraining component 8 from the engaging portion 61 of the third rod component 6, which provides an alternative release mechanism for disengagement of the restraining component 8 and the third rod component 6.

Operational principle of the stroller 200 is provided as follows. When it is desired to fold the stroller 200, the external component, such as the child seat, can be operated to pivot to abut against the operating inclined surface 93 of the driven component 9 to drive the driven component 9 to slide toward the base plate 11. When the driven component 9 slides toward the base plate 11, the driven component 9 drives the restraining component 8 to pivot and compress the second resilient component 10 by the abutment of the driving inclined surface 91 and the inclined portion 82 for disengaging the engaging notch 81 of the restraining component 8 from the engaging portion 61 of the third rod component 6. When the engaging notch 81 of the restraining component 8 is disengaged from the engaging portion 61 of the third rod component 6, the third rod component 6 and the first rod component 2 can be pivotally folded relative to the second rod component 4 to fold the stroller 200 because the third rod component 6 and the first rod component 2 are not abutted by the restraining component 8 and the linking component 5 respectively. At this movement, the first rod component 2 can be operated to be pivotally folded relative to the second rod component 4 to drive the third rod component 6 to be pivotally folded relative to the second rod component 4 by the linking component 5. When the first rod component 2 is pivotally folded relative to the second rod component 4, the abutting portion 21 moves from the first position to the second position. When the abutting portion 21 moves from the first position toward the second position, the abutting portion 21 abuts against the driven edge 33 of the locking component 3 to drive the locking component 3 to slide and compress the first resilient component 7. When the abutting portion 21 is located at the second position, the locking component 3 can be recovered by the resiliently deformed first resilient component 7 to drive the abutting edge 34 of the locking component 3 to abut against the abutting portion 21 for locking the abutting portion 21. At this movement, since the abutting portion 21 is locked by the abutting edge 34 of the locking component 3, it prevents the unintentional unfolding operation of the first rod component 2 relative to the second rod component 4 and an unintentional unfolding operation of the third rod component 6 relative to the second rod component 4, which locks the stroller 200 in the folded state.

When it is desired to unfold the stroller 200, it only has to operate the first rod component 2 to be pivotally unfolded relative to the second rod component 4 by overcoming abutment of the abutting edge 34 and the abutting portion 21 to move the abutting portion 21 from the second position to the first position. Afterwards, the restraining component 8 can be recovered by the second resilient component 10 to engage the engaging notch 81 of the restraining component 8 with the engaging portion 61 of the third rod component 6 to lock the stroller 200 in the unfolded state.

Figure 13:
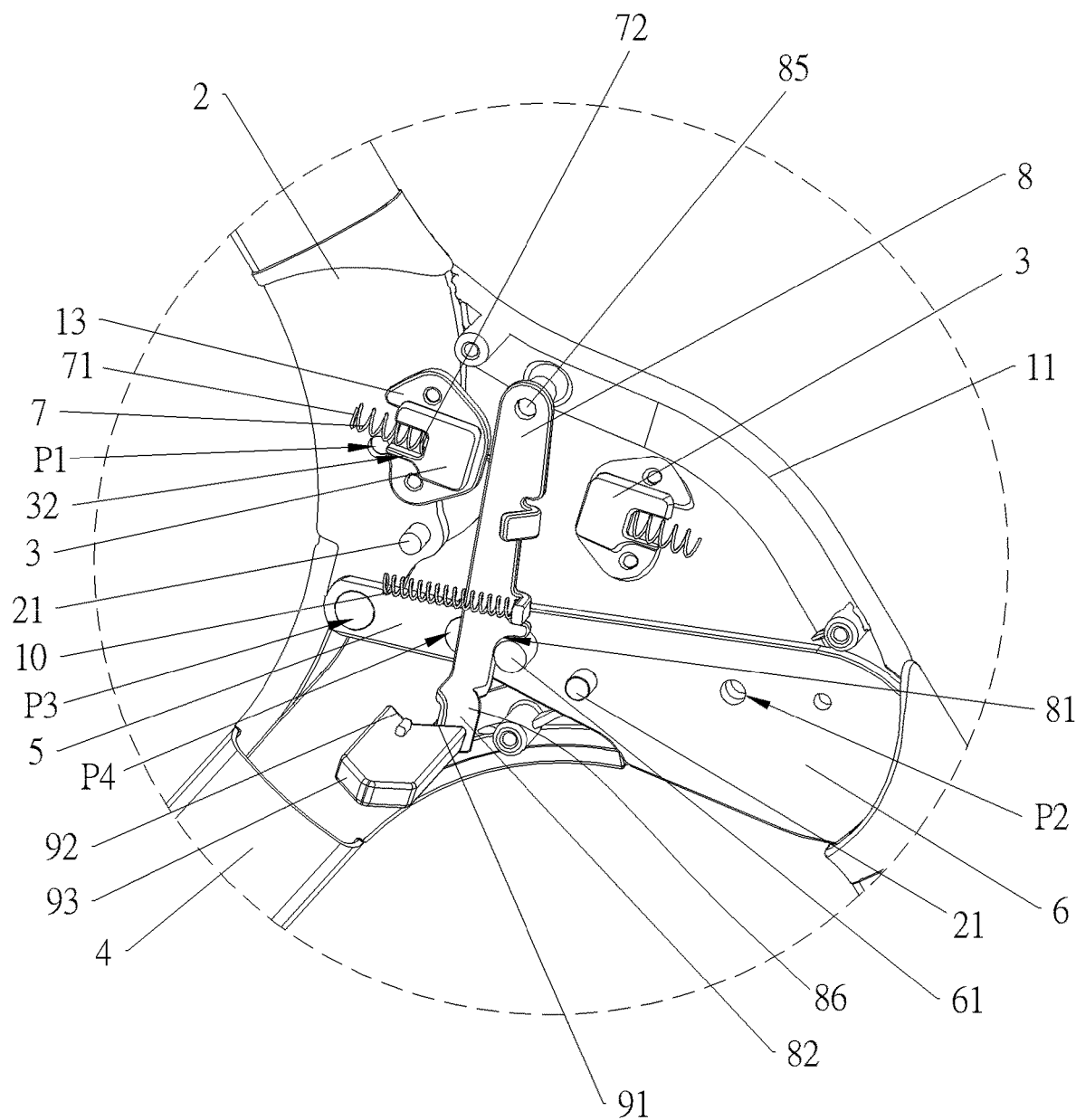
FIG. 13 is a partial diagram of a stroller according to another embodiment of the present invention.

Furthermore, the number and the configuration of the locking component are not limited to this embodiment. For example, please refer to FIG. 13. FIG. 13 is a partial diagram of a stroller according to another embodiment of the present invention. In this embodiment, the first rod component 2, the second rod component 4, the third rod component 6 are the handle, the rear foot and the front foot respectively, and each of the first rod component 2 and the third rod component includes the abutting portion 21. The rod locking mechanism can include two locking components 3 movably disposed on the base plate 11 of the central hub and respectively located near the handle and the front foot. The two locking components 3 can respectively abut against the abutting portions 21 of the first rod component 2 and the third rod component 6 when the first rod component 2 and the third rod component 6 are pivotally folded relative to the second rod component 4.

In contrast to the prior art, in the present invention, when the first rod component is pivotally folded relative to the central hub, the abutting portion can move from the first position to the second position. When the abutting portion is located at the second position, the abutting portion abuts against the second side of the locking component to restrain the abutting portion from leaving from the second position for locking the first rod component, so as to prevent the unintentional unfolding operation of the first rod component. When it is desired to pivotally unfold the first rod component relative to the central hub, the first rod component can be operated to drive the abutting portion to move from the second position to the first position by overcoming abutment of the locking component, which achieves the purpose of the unlocking operation and the unfolding operation of the first rod component. The rod locking mechanism of the present invention can lock the first rod component for preventing the unintentional unfolding operation of the first rod component when the first rod component is pivotally folded and can unlock the first rod component by operating the first rod component to overcome the abutment of the locking component. Therefore, the present invention brings convenience in transportation or carrying. Furthermore, the present invention has advantages of not only simple structure and easy operation but also enhanced safety and enhanced usability.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A rod locking mechanism comprising:
a central hub;
a first rod component pivotally connected to the central hub, the first rod component comprising an abutting portion, the abutting portion being movable between a first position and a second position when the first rod component pivots relative to the central hub; and
a locking component movably disposed on the central hub, the abutting portion being located at a first side of the locking component when the abutting portion is located at the first position, the abutting portion driving the locking component to move when the abutting portion moves from the first position toward the second position, and the abutting portion abutting against a second side of the locking component opposite to the first side of the locking component when the abutting portion is located at the second position.

2. The rod locking mechanism of claim 1, wherein the locking component is slidably disposed on the central hub, and the abutting portion pushes the locking component to slide when the abutting portion moves from the first position toward the second position.

3. The rod locking mechanism of claim 2, further comprising a first resilient component for biasing the locking component to recover, a first end of the first resilient component abutting against the central hub, and a second end of the first resilient component abutting against the locking component.

4. The rod locking mechanism of claim 3, wherein an accommodating slot is formed on the locking component for accommodating the second end of the first resilient component.

5. The rod locking mechanism of claim 2, wherein the locking component comprises a driven edge, and the locking component is driven to slide by cooperation of the driven edge and the abutting portion when the abutting portion moves from the first position toward the second position.

6. The rod locking mechanism of claim 5, wherein the locking component further comprises an abutting edge, and the locking component abuts against the abutting portion by the abutting edge when the abutting portion is located at the second position.

7. The rod locking mechanism of claim 6, wherein the driven edge and the abutting edge are inclined relative to a sliding direction of the locking component, a sign of a slope of the driven edge relative to the sliding direction of the locking component is opposite to a sign of a slope of the abutting edge relative to the sliding direction of the locking component, and an absolute value of the slope of the driven edge relative to the sliding direction of the locking component is greater than an absolute value of the slope of the abutting edge relative to the sliding direction of the locking component.

8. The rod locking mechanism of claim 2, wherein the central hub comprises a fixing base, and the locking component is slidably disposed on the fixing base.

9. The rod locking mechanism of claim 8, wherein at least one long hole is formed on the fixing base, at least one sliding slot is formed on the locking component, at least one wall of the at least one long hole is inserted into the at least one sliding slot, the locking component is slidable along a longitudinal direction of the long hole by cooperation of the at least one sliding slot and the at least one wall of the at least one long hole.

10. A stroller comprising:
a rod locking mechanism comprising:
a central hub;
a first rod component pivotally connected to the central hub, the first rod component comprising an abutting portion, the abutting portion being movable between a first position and a second position when the first rod component pivots relative to the central hub; and
at least one locking component movably disposed on the central hub, the abutting portion being located at a first side of the at least one locking component when the abutting portion is located at the first position, the abutting portion driving the at least one locking component to move when the abutting portion moves from the first position toward the second position, and the abutting portion abutting against a second side of the at least one locking component opposite to the first side of the at least one locking component when the abutting portion is located at the second position; and
a second rod component fixed on the central hub, the first rod component being pivotally movable relative to the second rod component.

11. The stroller of claim 10, further comprising a linking component and a third rod component pivotally connected to the central hub, and two ends of the linking component being respectively pivotally connected to the first rod component and the third rod component.

12. The stroller of claim 11, wherein the first rod component is one of a handle and a front foot, the third rod component is another one of the handle and the front foot, the second rod component is a rear foot, the at least one at least one locking component comprises two locking components, and the two locking components respectively abut against the first rod component and the third rod component when the first rod component and the third rod component are pivotally folded relative to the second rod component.

13. The stroller of claim 10, wherein the at least one locking component is slidably disposed on the central hub, and the abutting portion pushes the at least one locking component to slide when the abutting portion moves from the first position toward the second position.

14. The stroller of claim 13, wherein the rod locking mechanism further comprises a first resilient component for biasing the at least one locking component to recover, a first end of the first resilient component abuts against the central hub, and a second end of the first resilient component abuts against the at least one locking component.

15. The stroller of claim 14, wherein an accommodating slot is formed on the at least one locking component for accommodating the second end of the first resilient component.

16. The stroller of claim 13, wherein the at least one locking component comprises a driven edge, and the at least one locking component is driven to slide by cooperation of the driven edge and the abutting portion when the abutting portion moves from the first position toward the second position.

17. The stroller of claim 16, wherein the at least one locking component further comprises an abutting edge, and the at least one locking component abuts against the abutting portion by the abutting edge when the abutting portion is located at the second position.

18. The stroller of claim 17, wherein the driven edge and the abutting edge are inclined relative to a sliding direction of the at least one locking component, a sign of a slope of the driven edge relative to the sliding direction of the at least one locking component is opposite to a sign of a slope of the abutting edge relative to the sliding direction of the at least one locking component, and an absolute value of the slope of the driven edge relative to the sliding direction of the at least one locking component is greater than an absolute value of the slope of the abutting edge relative to the sliding direction of the at least one locking component.

19. The stroller of claim 13, wherein the central hub comprises a fixing base, and the at least one locking component is slidably disposed on the fixing base.

20. The stroller of claim 19, wherein at least one long hole is formed on the fixing base, at least one sliding slot is formed on the at least one locking component, at least one wall of the at least one long hole is inserted into the at least one sliding slot, the at least one locking component is slidable along a longitudinal direction of the long hole by cooperation of the at least one sliding slot and the at least one wall of the at least one long hole.

21. The stroller of claim 10, wherein the first rod component is one of a handle and a front foot, the second rod component is a rear foot, and the at least one locking component abuts against the first rod component when the first rod component is pivotally folded relative to the second rod component.

* * * * *